United States Patent Office 3,428,599
Patented Feb. 18, 1969

3,428,599
METHOD FOR PREPARING, WITHOUT PREMATURE GELATION, ORGANOPOLYSILOXANE
Charles W. Newing, Jr., Sylvania, Ohio, assignor to Owens-Illinois, Inc., a corporation of Ohio
No Drawing. Filed May 24, 1965, Ser. No. 458,378
U.S. Cl. 260—46.5    9 Claims
Int. Cl. C08g 31/06, 47/04

ABSTRACT OF THE DISCLOSURE

Methods of preparing, without premature gelation, organopolysiloxanes from organotrialkoxysilane monomers. Premature gelation is prevented by controlling the acidity of the polymers during the precuring step by means of a silazane such as hexamethyldisilazane. The resultant organopolysiloxanes have a shelf life previously not obtainable and are capable of being cured to provide hard, solid castings and coatings.

---

This invention relates broadly to compositions and their preparation including the preparation of organopolysiloxanes, and more particularly to novel means for controlling the acidity of an organopolysiloxane during its preparation, and especially during precuring. Still more particularly the invention is concerned with a method of reducing the acidity of a reactive material selected from the group consisting of monomeric precursors of an organopolysiloxane and siloxane partial condensation products of the hydrolysis product of a hydrolyzable silane, which material contains an objectionably high total acid content.

In one preferred embodiment of the invention the organopolysiloxane comprises or consists essentially of the siloxane condensation product of the hydrolysis product of hydrolyzable silane including at least one compound represented by the general formula (I)          

wherein each T independently represents a monovalent hydrocarbon radical [e.g., alkyl (including cycloalkyl), alkenyl and aryl radicals] having less than 7 carbon atoms, each Z independently represents a hydrolyzable group, and n represents a positive integer less than 4.

It will be understood, of course, by those skilled in art that some or all of the Z's in Formula I can also represent an —OH group. Hence, the term "hydrolyzable" as used herein and in the appended claims is intended to include within its meaning compounds wherein the hydrolyzable group or groups have already been hydrolyzed to an —OH group or groups unless it is clear from the context that the more limited meaning is intended. The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

The present invention is, in one of its embodiments, an improvement in a method of preparing, and especially in precuring, organopolysiloxane compositions of the kind disclosed and claimed in Burzynski and Martin copending applications Ser. No. 306,344, filed Sept. 3, 1963, now abandoned, and Ser. No. 370,684, filed May 27, 1964 now abandoned. Reference is also made to my copending applications Ser. No. 388,628, filed Aug. 10, 1964, and Ser. No. 418,531, filed Dec. 15, 1964 now U.S. Patent 3,367,910, directed to certain modifications of the compositions of the aforementioned Burzynski et al. applications. All of these applications are assigned to the same assignee as the present invention, and by this cross-reference are made a part of the disclosure of the instant invention.

It is sometimes desirable in making organopolysiloxanes of the kind contemplated by the disclosures in the afore-mentioned copending applications, as well as in making other compositions including other organopolysiloxanes, that means be provided for controlling the acidity of the reaction mass, especially during precuring. By thus controlling the acidity, e.g., by reducing it to zero or substantially zero during precuring, one can avoid or minimize the possibility of premature gelation of the organopolysiloxane before the desired optimum amount of by-products of the condensation reaction, e.g., alcohol, has been evolved. The following are desirable properties of such an acidity-control or neutralizing agent:

(1) It should react very rapidly as a base in presence of acid but should remain substantially neutral in a neutral solution.

(2) It should leave no residual organic groupings in the organopolysiloxane upon utilization of the latter.

(3) It should contain no carbon-to-carbon or other bonds that might rupture when the organopolysiloxane is subjected to a high temperature and, as a result, cause yellowing of the polysiloxane.

(4) It should have a boiling point higher than the condensation by-products, e.g., an alcohol, and specifically ethanol when the hydrolyzable silane is an ethoxysilane, and below that of the maximum precuring temperature, which is about 140° C. when the aforesaid hydrolyzable silane is employed in making a siloxane condensation product of the hydrolysis product of the said silane.

The present invention is based on my discovery that certain silazanes, more particularly organodisilazanes, meet the foregoing requirements in all respects. Such disilazanes include hexaalkyldisilazanes embraced or represented by the general formula:

(II)          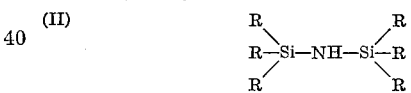

wherein each R represents an alkyl radical, especially an alkyl radical having less than 4 carbon atoms, that is, from 1 to 3 carbon atoms, inclusive. The alkyl radicals may be the same or different. Preferably all of the R's are the same alkyl radicals. Thus, all R's may be, for example, either methyl, ethyl, η-propyl or isopropyl radicals.

Of the disilazanes embraced by Formula II it is preferred, especially when the hydrolyzable silane includes an ethoxysilane, more particularly a triethoxysilane, to use hexamethyldisilazane (HMDS) as the acidity-control agent. HMDS is eminently suitable in this respect, since it meets all the requirements set forth under Items 1 through 4, supra. Furthermore, products resulting from its hydrolysis, viz, trimethylsilanol, and the condensation product of two moles of the latter with each other, viz., (CH$_3$)$_3$Si—O—Si(CH$_3$)$_3$, are both volatile below the usual maximum precure temperature of 140° C. employed when precuring a methylsiloxane partial condensation product. It is also possible that some of the trimethylsilanol may co-condense with the siloxane partial condensation product during precure.

Taking methyltriethoxysilane (MTS) as illustrative of the hydrolyzable silane employed in making the siloxane partial condensation product and HMDS as exemplary of the acidity-control agent, the following are some of the surprising and unobvious results obtained by practicing the present invention:

(1) Siloxane partial condensation products resulting from the incomplete condensation of the product of hydrolysis of 1 mole of MTS with 3 moles of water and which, due to their acid content, gelled when heated with agitation to temperatures ranging from 95° C. to 120° C. during attempted precures by prior techniques, have been precured to 140° C. without gelation in accordance with this invention.

(2) The size of the batches that can be successfully precured at temperatures up to 140° C. has been increased from 3- to 6-fold by volume as compared with prior precuring methods in the absence of a disilazane of the kind embraced by Formula II.

(3) Siloxane partial condensation products prepared as described under (1), supra, except that they were precured under vacuum at a temperature equivalent to a maximum temperature of 140° C. at atmospheric pressure, and which retained their flow properties over a 6-month period even though they contained about 85 weight percent of organopolysiloxane resin solids, have been obtained by using an acidity-control agent of the kind with which this invention is concerned. Products having such shelf stability heretofore have not been obtainable. In fact, products similarly prepared in the absence of the HMDS set-up (i.e., gelled) in 24 hours.

By using a silazane (e.g., a disilazane of the kind embraced by Formula II) as a neutralizing agent one can employ, if desired, less pure hydrolyzable silane(s) as starting reactant(s). Furthermore, more acid may be present, if desired, during hydrolysis thereby facilitating hydrolysis of the hydrolyzable silane to a more complete state. Another advantage is that when the aforementioned silazanes are employed, they are not subject to concentration as are other neutralizing agents. Still another advantage is that when such silazanes are present in a liquid siloxane partial condensation product during the precuring step, they do not add any chemical bonds that would change the excellent U.V. transmission of the final, cured organopolysiloxane.

The silazanes, more particularly hydrocarbyldisilazanes, used in carrying this invention into effect are easily decomposed by heating with an acidic species, but decompose relatively slowly when boiled in a non-acidic or neutral liquid media. For example, HMDS decomposes to the extent of only about 50% when boiled for 24 hours in a 1:1 volume solution of ethanol and water.

In its broader aspects the present invention provides a method which comprises incorporating a neutralizing agent comprising at least one silazane (e.g., 1, 2, 3 or more silazanes) into a substance containing acidic bodies (including potentially acidic bodies), especially such bodies in a small amount (e.g., a trace amount such as from 0.5 to 10 parts per million up to about 2 or 3 percent, calculated as HCl), by weight of the said substance. The silazane may be either straight-chain or cyclic, more particularly an organodisilazane or an organocyclosilazane, and still more particularly a hydrocarbyldisilazane or a hydrocarbylcyclosilazane. The silazane is incorporated into the said substance in an amount effective in at least partly neutralizing the above-mentioned acidic bodies.

In another broad aspect of the invention there is provided a method of stabilizing a composition comprising a substance that normally forms acidic bodies by oxidative deterioration which comprises incorporating into the said composition an effective stabilizing amount of a stabilizer comprising at least one silazane, including the hydrocarbylsilazanes, both straight-chain and cyclic. The amount of such stabilizing agent may vary, for example, from a trace amount (e.g., when only trace amounts of acidic bodies are present and/or are formed) up to that amount which will reduce the content of the acidic bodies to zero or substantially zero, i.e., to almost zero, as and when such bodies are formed.

The composition features of the invention will be more fully discussed later herein.

THE HYDROLYZABLE SILANE

As indicated in the second paragraph of this specification, the hydrolyzable silane reactant may include at least one compound of the kind embraced by Formula I. A preferred subclass and sub-subclasses and species under this broader class are described below. One such subclass of hydrolyzable silanes includes at least one compound represented by the general formula (III)
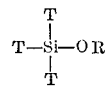

wherein each T independently represents a monovalent hydrocarbon radical [e.g., alkyl (including cycloalkyl), alkenyl and aryl radicals] having less than 7 carbon atoms, and the alkoxy radical, RO—, wherein R represents an alkyl radical, especially alkyl radicals having less than 4 carbon atoms.

Also of particular usefulness under the group embraced by Formula III are hydrolyzable silanes that include an alkoxysilane represented by the general formula (IV)
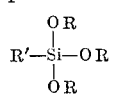

wherein each R represents an alkyl radical having less than 4 carbon atoms and R' represents a monovalent hydrocarbon radical [e.g., alkyl (including cycloalkyl), alkenyl and aryl radicals] having less than 7 carbon atoms, and each R represents an alkyl radical that may be the same or different, especially alkyl radicals having less than 4 carbon atoms.

Another group of particular usefulness embraced by both Formulas III and IV are hydrolyzable silanes that include an alkoxysilane represented by the general formula (V)
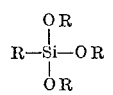

wherein each R represents an alkyl radical that may be the same or different, especially alkyl radicals having less than 4 carbon atoms. Preferably R in Formula V that is attached directly to silicon represents the methyl radical, in which case the compounds are methyltrialkoxysilanes represented by the general formula (VI)
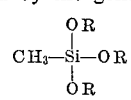

wherein each R represents an alkyl radical that may be the same or different, especially alkyl radicals having less than 4 carbon atoms.

Other alkoxysilanes of particular interest are those wherein R' in Formula IV represents the phenyl radical, $C_6H_5$—, in which case the compounds or phenyltrialkoxysilanes represented by the general formula (VII)
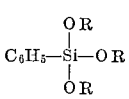

wherein each R has the same meaning as given above with reference to Formulas III through VI. Of the alkoxysilanes embraced by Formulas VI and VII, the more preferred ones that are employed in practicing this invention are those wherein each R represents the ethyl radical, that is, methyltriethoxysilane (MTS) and phenyltriethoxysilane (PTS).

Illustrative examples of groups represented by Z in Formula I include, for example, halogen (chlorine, bromine, fluorine and iodine), alkoxy (e.g., methoxy through heptoxy), and acyloxy e.g., acetoxy, propionoxy, butyroxy, pentanoxy, hexanoxy, etc.), and aryloxy, e.g., phenoxy. In particular, alkoxy groups are preferred because their hydrolysis products are less acidic, and therefore control of the rate of siloxane condensation is simpler. Alkoxy groups of less than 5 carbon atoms, more particularly less than 4 carbon atoms, are especially advantageous (and are preferred) for the radical represented by Z in Formula I, because the rate of hydrolysis can be inconveniently slow when the organic hydrolyzable radical(s) have a higher molecular weight (i.e., more carbon atoms). Illustrative examples of radicals represented by T in Formula I are alkyl, e.g., methyl, ethyl and propyl through hexyl (both normal and isomeric forms), cyclopentyl, cyclohexyl, vinyl and the normal and isomeric forms of propenyl through hexenyl, and phenyl.

More specific examples of hydrolyzable silanes that are embraced by one or another of the formulas designated by Roman numerals I through VII are: trimethylmethoxysilane, tri (1-methylethyl) ethoxysilane, di (1-methylpropyl) diethoxysilane, divinyldipropoxysilane, diphenyldiethoxysilane, propylpentylmethoxyethoxysilane, methylallyl di (1-methylethoxy)silane, vinylphenyldimethoxysilane, ethyltriethoxysilane, (1-methylethyl) trimethoxysilane, (1,1-dimethylethyl) tripropoxysilane, hexyltriethoxysilane, and vinyltriethoxysilane.

Other examples of alkoxysilanes within the scope of the subclasses represented by Formulas V, VI and VII, especially the last two, and which can be used in practicing this invention, are methyltrimethoxysilane, methyltriethoxysilane, methyltri(1-propoxy)silane, methyltri (2-propoxy)silane, methyltri(2-methyl-2-propoxy)silane, methyltri (1-butoxy)silane, and methyltri(2-butoxy) silane; examples of phenyltrialkoxysilanes are phenyltrimethoxysilane, phenyltriethoxysilane, phenyltri(1-propoxy)silane, phenyltri(2-propoxy)silane, phenyltri(2-methyl-2-propoxy)silane, phenyltri(1-butoxy)silane, and phenyltri(2-butoxy)silane.

The means selected to effect hydrolysis of the starting materials and condensation of the resultant silanols is dependent primarily upon the physical characteristics desired in the product. When liquids or films are to be prepared, hydrolysis and condensation can be carried out simply by contacting the monomer or mixture of monomers with water. Usually, however, one or more conditions designed to increase speed or homogeneity of reaction, such as stirring, elevated temperatures, addition of acid or base, use of added solvent, are used. Viscosity of the final product can be regulated by controlling the time of reaction, use of catalysts, concentration of reactants, rate of evaporation, and similar variables. The particular manner in which control of these variables is effected depends upon the particular circumstances, and can be determined by routine experimentation according to procedures generally well known to those skilled in in the art.

PREPARATION OF ORGANOPOLYSILOXANES

In general, the preparation of the organopolysiloxane comprises heating a hydrolyzable silane including at least one compound embraced by Formula I with from 1.5 to 10 moles of water for each mole of the total molar amount of the hydrolyzable silane(s). Heating is continued for at least one hour and up to about 10 hours or more at a temperature of at least about 50° C. while retaining at least about 1.5 moles of hydroxy-containing by-products in the reaction mass per mole of silicon-containing starting material, assuming complete hydrolysis of all the hydroxyhydrocarbyl-silicon linkages in the said reaction mass. Thereafter the temperature of the reaction mass is gradually raised to a final temperature of from about 100° C. to about 300° C. while gradually removing, by volatilization, alkanol by-products and some water. This occurs over a time interval of at least 5 minutes. Thereafter, condensation and heating are continued in the aforesaid temperature range of from 100°–300° C. for a period short of gel or solid formation within the said temperature range.

Suitable experimentally-determined variations of the time and temperature parameters of the process involved in making the organopolysiloxanes would probably allow use of, for example, alkoxysilanes containing a higher number of carbon atoms in an alkoxy chain. However, in general, the longer hydrolysis time required by alkoxy radicals of longer chainlength makes them, ordinarily, undesirable for use.

As has been indicated hereinbefore, the concentration of water in the initial hydrolysis-condensation reaction mixture advantageously is at least about 1.5 moles, more particularly from about 1.5 moles to about 10 moles of water, per mole of the total amount of hydrolyzable silane reactant(s). Organopolysiloxane resins can be prepared at the aforementioned lower concentration of water, but further decrease in the water content of the reaction mass ordinarily leads to the production of polymers that are rubbery and soft, presumably due to incomplete hydrolysis and condensation. If the quantity of water is in the range of from about 1.5 moles to about 5 moles of water per mole of the hydrolyable silane(s), the hydroxy-containing by-products, e.g., alkanols formed during hydrolysis, act as a solvent for the other products and reactants, as a result of which the initially heterogeneous reaction mass becomes clear and homogeneous. This homogeneity is desirable, since it prevents resin precipitation and allows more uniform control of resin formation.

If the ratio of water to hydrolyzable silane(s) substantially exceeds 5:1, the resulting amount of by-product hydrolysis products, such as alkanols, is insufficient to convert the aqueous medium to a solvent for the reactants and the reaction products, and resin precipitation can occur. Insolubility of resinous products at higher water concentrations can be overcome by adding a water-miscible organic solvent, e.g., ethanol, isopropanol, or any other organic solvent for the polymer having water-miscibility characteristics. However, at water-concentrations above about 10 moles of water per mole of hydrolyzable silicon-containing monomer, gel formation may occur even if sufficient organic solvent is added to make the reaction mass homogeneous. The exact upper limit of the ratio of water to hydrolyzable silicon-containing monomeric material is dependent upon such influencing factors as, for example, the particular hydrolyzable silicon-containing material employed, the pH and temperature of the reaction mass, time of reaction, etc. Hence the upper limit cannot be set forth precisely, but can be determined by routine test in each case. The limits within which no addition of organic solvent is required, viz, from about 1.5 moles to about 5.0 moles of water per mole of hydrolyzable silicon-containing monomer, are preferred.

At pressures near one atmosphere, temperatures in the range of from about 50° C. to the reflux temperature of the reaction mass are useful. Temperatures much below this range require substantially longer times for reaction, and thus obviate a particularly advantageous aspect of the resin-making process, namely, its relatively high speed of operation. Also, no particular improvement in properties is attained by the use of such lower temperatures. In general, temperatures at or near the reflux temperature of the reaction mass are preferred, especially when refluxing occurs at from about 70° C. to about 90° C. Under the concentration and temperature conditions hereinbefore described, the initial hydrolysis and condensation are complete in from about 1 to about 10 hours, depending upon the particular materials and conditions used, and generally within from about 2 to 4 hours.

It is preferred that some of the hydrolysis by-products, such as alkanols, be retained in the reaction mass during the initial hydrolysis and condensation. It is believed that the presence of such hydroxy-containing by-products slows, by mass action, the overall rate of hydrolysis-condensation.

After initial hydrolysis and condensation under the conditions just described, controlled volatilization of the hydrolysis by-products, e.g., alkanols, and water, is effected while the reaction mass is heated to from about 100° C. to about 300° C. This relatively high (i.e., above 100° C.) temperature step is herein designated as the "precure" step.

The purpose of precure is to effect controlled removal of volatiles while the siloxane condensation reaction continues at a convenient rate, but which is nevertheless slowly enough to avoid gel formation. In general, the highest possible precure temperature is preferred, since this provides greatest impetus to siloxane formation and volatilization of the hydrolysis by-products, and makes possible the shortest time required to effect final cure at a lower temperature.

The temperature to which a particular reaction mass can be heated during precure without causing or tending to cause gelation thereof depends, for example, upon the particular materials used and their prior treatment, but the limit can be readily established by heating an aliquot to gelation and keeping the precure temperature of the main batch slightly below this gelation point. The precure time is similarly dependent upon several variables. At a precure temperature above 100° C. it is, in general, at least about 5 minutes, although the time at the highest temperatures attained can be merely momentary.

To avoid gelation and to effect polysiloxane formation at a conveniently rapid rate, the acidity of the initial hydrolysis-condensation reaction mass advantageously is maintained within certain limits hereinafter set forth in detail. Commercial hydrolyzable silicon-containing compounds (silanes) of the kind embraced by Formula I, such as commercial alkoxysilanes, usually contain a quantity of acid or base that exceeds the relatively narrow limits permissible in the initial reaction mixture employed in practicing a preferred embodiment of the instant invention. Impure monomers can be used in the hydrolysis reaction mixture, followed by addition of acid or base to adjust the pH to the required level. However, the large amount of salts that are formed impair desirable properties, especially transparency, of the final products. Salts, particularly those of variable-valence cations, may also act as catalysts for siloxane formation. It is, therefore, preferable to adjust the pH of the monomer or mixture of monomers before preparing the reaction mixture. Simple distillation is unsuitable because it increases the acidity of the monomeric material, probably by oxidation of some organic groups to acidic or potentially acidic functions such as carboxylic acids, esters, aldehydes and/or ketones. Use of a nitrogen atmosphere is insufficient to prevent this acidity increase, apparently because the system itself contains oxidizing species. Reduction of acid content can be carried out by adding bases such as metal hydroxides or amines, but the salts that are formed are objectionable impurities in the final products.

As has been indicated hereinbefore, the present invention is especially valuable in improving the conditions of precuring a siloxane partial condensation product whereby the unexpected and unobvious results previously set forth are obtained. Thus, the invention provides a method of precuring, for example, a liquid siloxane partial condensation product of the hydrolysis product of a hydrolyzable silane such as those embraced by Formulas I through VII, more particularly a hydrolyzable silane including an alkoxysilane represented by Formula IV. The method comprises precuring said partial condensation product at an elevated temperature in the presence of a silazane, preferably a hexaalkyldisilazane of the kind embraced by Formula II. A more detailed discussion of the time and temperature of curing is given hereafter. The amount of the hexaalkyldisilazane that is incorporated into the siloxane partial condensation product is such as will reduce the acidity of the said condensation product to the desired level during precure thereof. The reduction in acidity obviously should be sufficient to avoid premature gelation of the partial condensation product while precuring under heat. A reduction in acidity during precuring to zero or almost zero is preferred.

A specific embodiment of the present invention is the method of precuring a liquid partial condensation product of the hydrolysis product of methyltriethoxysilane which comprises precuring the said partial condensation product by heating it to a temperature up to about 140° C. while admixed with hexamethyldisilazane in an amount effective in reducing the acidity of the said partial condensation product during precure thereof.

With further reference to the conditions of effecting the conjoint hydrolysis and condensation of the silane reactant(s), it may be stated that the initial hydrolysis-condensation is conveniently carried out by charging to a reaction vessel pure water and a hydrolyzable silane of the kind embraced by Formula I. The initially cloudy reaction mixture clears on heating, usually within an hour, because the hydroxyhydro-carbon by-product, specifically alcohol, dissolves the other components of the mixture. A suitable degree of hydrolysis-condensation is usually obtained if reflux is allowed to proceed for from about 1 to 4 hours after the mixture clears. This step can be carried out at lower temperatures, but the rate is substantially slower.

The upper limit of permissible acid content during this initial hydrolysis-condensation is that beyond which gel formation occurs. The lower limit is determined by the desired reaction time. In general, the minimum reaction time to obtain satisfactory products is usually about 1 hour under reflux. Maximum and minimum allowable acid contents vary with the ratio of hydrolyzable silane(s) and water used. The lower theoretical water content is $Z/2$, where $Z$ is the average number of hydrolyzable groups attached to silicon throughout the reaction mass. Thus when the hydrolyzable silane is, for example, a methyltrialkoxysilane as the sole silane constituent, the theoretical lower molar ratio of hydrolyzable silane:water is 1:1.5. At this molar ratio, the acid content is generally controlled within the range of from about 50 to about 650 parts (or higher in some cases) of HCl per million parts of hydrolyzable silane. When the hydrolyzable silane:water molar ratio is 1:3.0, the minimum acid content is about zero part of HCl per million parts of the hydrolyzable silane and the maximum is about 5 parts on this same basis.

The aforementioned limits are necessarily subject to minor variation in each case. First, polymer formation by its nature will not proceed identically in any two runs, and the particular mode of polymerization can alter slightly the acid sensitivity of the system. Second, use of other hydrolyzable silanes in certain amounts as co-monomers can reduce acid sensitivity, but the effect will generally be small. Third, extremely small quantities of impurities in a given sample, impractical to remove, can alter acid sensitivity slightly. These factors, however, affect only the maximal and minimal extremes of acid content, and the major portion of the suitable area indicated will be unchanged.

It is usually most convenient to reduce the acid content of the monomer(s) to about zero part by weight of HCl per million parts of monomer(s) by suitable acid-removal technique and, if necessary, then adjust the acidity of the initial reaction mixture by adding acid to the water used.

Hexaalkyldisilazanes of the kind embraced by Formula II are useful in reducing the acid content of the hydrolyzable silane monomers, and hence, if desired, may be admixed with the monomers prior to hydrolysis thereof as a means of controlling the acidity. For economical reasons it is usually not desirable to use silazanes for this purpose since they are more expensive than conventional neutralizing agents. However, if used for this purpose it will be understood, of course, that complete neutralization with the disilazane is not effected at this stage since some slight acidity is usually desirable in order to facilitate a maximum degree of hydrolysis. Or, they may be introduced at other stages in the preparation of the organopolysiloxane as hereafter more fully described.

The reaction mass obtained from the initial hydrolysis-condensation reaction is concentrated by removing volatile components, conveniently by distillation from the vessel containing the said mass. All of the solvents should not be removed or the resin will have a pronounced tendency to gel. Usually, removal of about 80 mole percent of the hydroxyhydrocarbon by-product, e.g., an alkanol, gives a residue convenient to manipulate further by the particular means herein described. The concentrate thus obtained is next heated to a temperature above the boiling point of pure water at the prevailing pressure for a specified time, conveniently while stirring in an open vessel. The time and temperature of this precure step are determined by the particular composition used, but in general a temperature of 110° to 300° C. at ambient pressure and a period up to about 30 minutes are typical. The elimination of water and other volatile materials from the reaction mass at this point presumably leads to further linear polymerization and cross-linking, and the mass becomes increasingly viscous.

If the precure step is omitted from the process, the resins cast from the liquid, organopolysiloxane crack severely during the final curing step.

Comonomers embraced by Formula I and also by Formula III, if employed, can be used to modify the properties of the resins according to principles known generally to the art. Thus, comonomers containing 3 or 4 alkoxy groups act as cross-linking agents; those with 2 alkoxy groups act to increase chain length and decrease cross-linking; and those with one alkoxy group act as chain-terminating agents. In particular, inclusion of dialkoxysilanes such as dimethyldiethoxysilane can be used to diminish cross-linking and thus provide less brittle products. Inclusion of more than about 5 mole percent of alkyl orthosilicates can lead to excessive cross-linking and attendant brittleness, and quantities of other comonomers substantially above this amount may cause decreased chemical resistance.

Typical of an organopolysiloxane resulting from a co-hydrolysis and co-condensation reaction is the product obtained by conjoint reaction of (a) an alkyltrialkoxysilane of the kind embraced by Formula V, more particularly a methyltrialkoxysilane within the scope of Formula VI, and (b) a compound of the kind embraced by Formula III. The initial co-hydrolysis and co-condensation reaction is conveniently carried out by placing in a flask pure water, methyltrialkoxysilane such as methyltriethoxysilane, the acid content of which has been suitably adjusted (e.g., with a disilazane of the kind within the scope of Formula II), and from 0 to 10 mole percent, preferably not more than 5 mole percent, based on the total hydrolyzable silanes, of a compound embraced by Formula III, e.g., phenyltriethoxysilane. If desired or deemed necessary, these monomeric precursors of an organopolysiloxane may be purified. The resulting mixture is then heated under reflux conditions, and further processed as previously has been described with reference to the hydrolysis and condensation of a single monomeric precursor.

In making methylpolysiloxanes referred to above, as well as, for instance, (methyl) (phenyl) polysiloxanes, some alkanol or other hydrolysis by-product should be retained, as previously indicated, in the reaction mass during hydrolysis and initial condensation for the reasons previously given. To avoid gelation and effect polysiloxane formation at a conveniently rapid rate, the acidity of the initial hydrolysis-condensation reaction mixture is suitably controlled. Thus, in accordance with this invention it can be controlled by incorporating therein a small amount, effective in reducing the acidity to the desired level, of a silazane, especially hexamethyldisilazane or other disilazane of the kind within the scope of Formula II. After initial hydrolysis and condensation controlled volatilization of hydrolysis by-products and water is effected, while the reaction mass is raised to a temperature within the range of 100° to 300° C., thereby to precure the siloxane partial condensation product (i.e., incompletely cured or condensed organopolysiloxane resin) in the manner and for the reasons previously stated. Additional silazane of the kind used in practicing this invention may be admixed with the partial condensation product, as desired or as may be required to reduce the acidity to almost zero and, preferably to zero, either immediately prior to or during the precuring heat-treatment. In this way, especially at zero acidity, the possibility of gelation is obviated.

Instead of using hydrolyzable silanes of the kind embraced by Formulas I through VII one may use the corresponding polyol derivatives alone or admixed (when necessary) to yield a curable organopolysiloxane, and with or without a silane mono-ol as a chain-terminating agent. When the silanols desired to be employed as starting reactant(s) cannot be isolated in pure state, then of course it is necessary to use a precursor of a silanol. Numerous illustrative examples of silanols that may be employed are given in my aforementioned copending application Ser. No. 418,531.

The silazane neutralizing or acidity-controlled agent used in this invention may be employed at any stage wherein it is desirable to control the acidity of the starting reactant(s) and/or the siloxane partial condensation products thereof. Thus, in some instances it may be advantageous to admix the silazane with the silanol(s) and/or precursor(s) of silanol(s) prior to hydrolysis (if a precursor or precursors are employed) and condensation to a partial condensation porduct. Or, in lieu of or in addition to the aforementioned point of utilization, the silazane may be added to the reaction mixture during hydrolysis and condensation to a siloxane partial condensation product, or immediately prior to or during the initial stages of precure of said condensation product.

From the foregoing it will be seen that the silazane, more particularly a disilazane, may be added at any time after hydrolysis and simultaneous condensation have been initiated (as well as prior thereto) up to the time or point during precure at which the partly cured organopolysiloxane still contains sufficient residual water and/or alcohol by-product to have a solvent action on the silazane, thereby permitting ease of admixture with the incompletely cured or condensed organopolysiloxane. For example, the silazane may be incorporated into the heat-curable organopolysiloxane while the latter contains at least about 20%, e.g., from 30 to 80 or 90%, by weight of the theoretical amount of volatile by-products of the reaction. Or, the silazane may be added to the reaction mass just prior to starting to distill off the volatile by-products.

The amount of silazane, e.g., a disilazane of the kind embraced by Formula II, that is added to the monomeric precursor and/or the reaction mass or siloxane partial condensation product at any of the points or stages hereinbefore mentioned is that amount which is required to reduce the acidity of the reactant and/or reaction product to the level desired or required in order to obtain optimum results. This is obviously a value that cannot be stated with precision and must be determined in the light of the particular circumstances. Thus, taking a disilazane as illustrative of the silazane employed, it may vary from a trace amount of disilazane (that is, an amount ranging from, for instance, 1 to 200 parts of disilazane, calculated as —Si—NH—Si—, per million parts of monomeric precursor and/or organopolysiloxane), which trace amount may or may not be sufficient to neutralize completely the acidity of the silicon-containing material to which it has been added, up to that amount of disilazane which will completely neutralize the acidity of the said silicon-containing material (that is, will reduce the acidity of the said material to zero).

Variations in the procedures hereinbefore described for the preparation of the organopolysiloxane can be achieved by individually hydrolyzing two or more different hydrolyzable silanes and then condensing them together. For example, one may individually hydrolyze a hydrolyzable methyltrialkoxysilane and a hydrolyzable phenyltrialkoxysilane, and then combine the resulting products to form a reactive mixture that is further processed as previously has been described. The resulting co-condensation product ultimately yields, when fully cured, a solid, machinable, heat-resistant organopolysiloxane body.

Products that can be prepared in practicing the method of this invention include machinable, heat-resistant bodies comprising or consisting essentially of the siloxane condensation product of methylsilanetriol and phenylsilanetriol, in a molar ratio of from 1:10 to 10:1 (preferably from 1:5 to 5:1), respectively, and into which also may be incorporated, e.g., by co-condensation of the later-named diol with the methylsilanetriol and phenylsilanetriol, from 0 to 10 (preferably from 0 to 5) mole percent of the siloxane condensation product of diphenylsilanediol.

Further processing including final curing and modifications that may be employed in practicing this invention are essentially the same as those described in my aforementioned copending applications and in the previously identified copending applications of Burzynski et al. For instance, modifiers that are substantially chemically inert during the further curing conditions employed can be added to the organopolysiloxane to obtain desired variations in properties. Fillers, e.g., diatomaceous earth and other forms of silica, as well as clays and clay-like materials, e.g., kaolin, bentonite, etc., powdered and flake metals such as powdered and flake aluminum, fibers, e.g., glass fibers, organic fibers of natural and synthetic origin, etc., can be added. Coloring agents such as alcohol- or water-soluble dyes or pigments can be incorporated in the organopolysiloxane to give compositions or bodies of the kind herein described and which are also colored. The quantity of dye or pigment and the most advantageous point of its addition depend upon such influencing variables, as, for instance, the particular coloring agent used and the desired color of the product.

Illustrative examples of other effect agents that may be incorporated into the organopolysiloxane are opacifiers, e.g., titanium dioxide, zinc oxide, etc., plasticizers, mold lubricants, heat-stabilizers, inhibitors of various kinds including decomposition inhibitors, natural and synthetic resins, and other modifiers or additives commonly employed in casting, molding, coating and other compositions.

After casting or otherwise shaping in a mold, or after deposition as a coating on a substrate, or other similar or equivalent action, the curable organopolysiloxane resin (i.e., organosiloxane partial condensation product) is cured. Cross-linking and some linear polymerization probably proceed at this stage since the resin becomes increasingly hard.

Taking as an example the production of a cast resin to obtain a hard, machinable, heat-resistant body, the final cure of such a resin can be carried out, if desired, at room temperature (20°–30° C.) or lower merely by allowing the cast resin to remain undistrubed.

Although the final cure may be effected without added heat, a more convenient procedure involves heating the precured organopolysiloxane resin at about 90° C. for varying time intervals, e.g., from about 1 to 3 days, or sometimes longer, for instance up to 7 days or more. The final stages of cure can also be carried out at temperatures above 100° C. after a cure at 90° C. has brought the resin to a substantially hard condition.

The resinous product of the precure step is soluble in water-miscible organic solvents such as alkanols (e.g., methanol through pentanol), ketones (e.g., acetone, methyl ethyl ketone, etc.), ethers (e.g., glycol monoethyl ether, tetrahydrofuran, etc.), as well as many other common organic solvents. The resulting solutions, especially those to which a silazane, more particularly a disilazane of the kind embraced by Formula II has been added before precure, in an amount ranging from 0.0001 to 1.0 weight percent based on the weight of the siloxane partial condensation product, have prolonged storage life before gelation occurs. Furthermore, their stability increases with decreasing temperature and resin concentration.

A lower limit for resin concentration is set only by convenience, since storage and subsequent removal of solvent from extremely dilute solutions is generally commercially unfavorable. These dilute solutions, usually containing about 50 weight percent of resin solids, can be evaporated to a more viscous stage and used as molding materials by the further curing steps already described. As previously indicated, they can also be used as film-forming materials, e.g., in coating applications, by spraying, brushing, or other means known to the art. The thickness of the resulting films can be controlled, of course, by varying the concentration of the resin solution and the number of layers applied. The coatings thereby obtained can be cured by heating, e.g., by the curing process previously described for making a molded resin. These films are useful, for example, as water- and abrasion-resistant coatings.

The above-described techniques for the preparation of solid, organopolysiloxane bodies are, in general, also applicable to the formation of such films. The final, cured products are substantially solid and apparently possess a high degree of cross-linking, since they are substantially insoluble in solvents such as benzene and toluene.

In order that those skilled in the art may better understand how the present invention can be carried into effect, the following examples are given by way of illustration and not by way of limitation. All parts and percentages are by weight unless otherwise stated.

Example 1

This example illustrates the preparation of methylpolysiloxane from methyltriethoxysilane (MTS) and precuring of the siloxane partial condensation product in the presence of hexamethyldisilazane (HMDS).

| Reactants | Weight Used, Grams | Moles Used |
|---|---|---|
| MTS | 132 | 0.75 |
| H$_2$O | 41 | 2.25 |

The MTS previously had been purified by distillation over about 1½ volume percent, based on the volume of MTS, of a saturated aqueous solution of sodium carbonate containing about 48.5 weight percent of Na$_2$CO$_3$.

The two reactants are heated together with stirring in a 250 ml., 3-necked, round-bottomed flask to about 80° C. (The flask is equipped with a thermometer, a magnetic stirrer and a condenser that is provided with a take-off to allow reflux or distillation.) After heating for about 10–15 minutes at this temperature a one-phase system is formed. Thereafter the reaction mass is heated under reflux for about 4 hours at about 80° C. At the end of the reflux period, during which hydrolysis and condensation of the MTS occurs, the equipment is arranged for distillation and about 80% (90 ml.) of the by-product ethanol is distilled off.

When the resulting liquid partial condensation product is heated with stirring, to 95° C. at atmospheric pressure (i.e., during a precuring step), it gels at said temperature.

In marked contrast, when the present invention is practiced liquid methylsiloxane partial condensation products can be heated to 140° C. at atmospheric pressure without gelation, as evidenced by the results of the following tests:

Three individual runs are made in the same way as described in the first part of this example to obtain from each run about 84 ml. of liquid methylsiloxane partial condensation product. When 1 drop (i.e., about 1/20 ml.), 3 drops and 5 drops of a disilazane of the kind embraced by Formula II, specifically HMDS, are added to each 84 ml. specimen immediately prior to precuring under heat, with stirring, each of the specimens can be precured by heating to 140° C. at atmospheric pressure without gelation. The aforementioned 1, 3 and 5 drops of HMDS that are added to about 84 ml. of the siloxane partial condensation product correspond to, by weight, about 460, 1380 and 2300 parts of HMDS, respectively, per million parts of MTS starting reactant.

Precuring of the liquid siloxane partial condensation product to which the HMDS has been added is effected by heating it with stirring to 140° C. at atmospheric pressure, e.g., over a period of about 20 minutes. The resulting viscous resin is cast into discs by pouring samples into an aluminum foil mold, 2 inches in diameter and about 3/4-inch deep. The cast resin is then cured by heating in a 90° C. oven for 7 days, yielding a hard, transparent resin that is heat-resistant and machinable.

The precured polymer may be used as an adhesive or as a laminating composition to join the same or different materials to be bonded together, e.g., glass-to-glass, metal-to-metal, glass-to-metal, wood-to-wood, wood-to-metal, glass-to-wood, and the like. The precured polymer is also useful as a coating composition or as a component of such compositions.

Example 2

This example illustrates the use of hexamethyldisilazane to improve the properties of a methylsiloxane partial condensation product and wherein precuring is effected under vacuum.

| | |
|---|---|
| MTS (redistilled over aqueous Na$_2$CO$_3$) _____g__ | 2675 |
| Aqueous HCl containing 153 p.p.m. of HCl __ml__ | 64.4 |
| Distilled water _____ml__ | 746 |
| Ratio of water to MTS _____ | 3.0:1 |
| HMDS _____drops__ | 15 |

The MTS is charged to a 5-liter reactor which is fitted with a mantle, agitator, reflux condenser, and thermometer. The aqueous HCl is mixed with the water, after which the acid-water mixture is charged to the reactor and heating and agitation are started. The reaction mixture is heated with agitation to 55°–60° C., after which the heat is turned off. The temperature of the reaction mass gradually rises over a period of about 25 minutes until the reflux temperature (pot temperature, 83°–84° C.) is reached.

Refluxing at a moderate to vigorous reflux rate is continued for 4 hours, after which 15 drops of HMDS (1 drop per gram mole of MTS) is added to the reaction mass. Refluxing is then continued for 5 minutes with the heat on plus 5 minutes with the heat off.

A vacuum source is cautiously pulled on the reactor; and after pulling vacuum to a pressure reading of 50–60 mm. Hg, the heat is turned on. The pressure is maintained at 55 mm. Hg until the reactor temperature reaches 85° C. over a period of from about 90–100 minutes.

When 85° C. and 55 mm. Hg are reached, the heat is turned off and the vacuum is released by bleeding air in at the vapor-temperature point to avoid distillate back-up.

Precuring as above-described corresponds to precuring at a temperature of at least 140° C. at atmospheric pressure.

The vacuum-precured siloxane partial condensation product is poured into plastic bottles which are tightly closed with screw tops. It contains about 85 weight percent of methylpolysiloxane resin solids.

This siloxane partial condensation product retains its flow properties over a period of at least six months. In marked contrast, methylsiloxane partial condensation products similarly prepared in the absence of HMDS set up (i.e., gel) in 24 hours.

Similar results are obtained when methylsiloxane partial condensation products are prepared using ratios of water to monomer of 2.0:1 and 2.5:1.

If desired, instead of placing the total batch of the thusly prepared siloxane partial condensation product into containers, only some of it may be thus packaged while the remainder is heated to 140° C. at atmospheric pressure for further precuring.

Example 3

This example illustrates the use of a disilazane, specifically HMDS, in the preparation of a (methyl)(phenyl) polysiloxane.

| Reactants | Weight Used, Grams | Moles Used | Molar Ratio |
|---|---|---|---|
| MTS | 89 | 0.50 | 2 |
| Phenyltriethoxysilane (PTS) | 57 | ca. 0.25 | ca. 1 |
| H$_2$O | 41 | 2.25 | 9 |

The foregoing reactants are heated together with stirring in a 250 ml., 3-necked, round-bottomed flask to about 80° C. The flask is fitted as described in Example 1. Usually after heating for about 5–10 minutes at this temperature a one-phase system is formed. The reaction mass is heated under reflux for 4 hours at the reflux temperature (about 80° C.). One (1) drop of HMDS is added to the reaction mass, the equipment is arranged for distillation, and about 80% (90 ml.) of the by-product ethanol is distilled off.

The residual organopolysiloxane is precured by heating at atmospheric pressure to 140° C. with stirring, e.g., over a period of 20 minutes. There is no evidence of gelation during precuring.

The precured polymer is cast as described in Example 1, and the casting is then further cured by heating in a 90° C. oven for about 7 days, yielding a solid, hard, heat-resistant, resinous condensation product.

Instead of MTS as in Examples 1 and 2 one may employ, for instance in individual runs, an equivalent molar amount of other hydrolyzable silanes, specifically alkoxysilanes (numerous examples of which have been given hereinbefore), including, for instance, the following:

(a) Ethyltriethoxysilane
(b) n-Butyltri-(n-propoxy)silane
(c) Propyltrimethoxysilane Also, instead of 2 moles fo MTS and about 1 mole of PTS as in Example 3, one may use (for instance in individual runs) substantially equivalent molar amounts of the following alkoxysilanes:

(a) 2 moles ethyltri-(n-propoxy)silane
    1 mole n-hexyl-tri-(n-propoxy)silane
(b) 2 moles methyltriethoxysilane
    1 mole cyclohexyltriethoxysilane
(c) 2 moles methyltriethoxysilane
    1 mole amyltriethoxysilane Specific examples of other silazanes that may be used as an acidity-control or neutralizing agent instead of hexamethyldisilazane in making organopolysiloxanes from the hydrolyzable silanes of Examples 1, 2 and 3, as well as from those set forth in the preceding paragraph and in the portion of this specification prior to the examples, are hexaethyl-, hexa-n-propyl- and hexaisopropyldisilazanes, and the unsymmetrical or "mixed" hexaalkyldisilazanes containing less than 4 carbon atoms in each alkyl grouping. It will be understood, of course, by those skilled in the art that the silazane is chosen in the light of the particular organopolysiloxane being made; and especially while keeping in mind the four desirable properties set forth in Items 1 through 4 of the fifth paragraph of this specification.

With further reference to the composition features of the invention to which attention was directed earlier herein, the present invention in its broader aspects also provides compositions of a scope corresponding to the broader aspects of the method features of the invention hereinbefore discussed. Thus, the invention provides compositions comprising a substance containing acidic bodies (including potentially acidic bodies), said acidic bodies having been at least partly neutralized with a neutralizing agent comprising at least one silazone. A single or a plurality of silazones (straight-chain or cyclic) may be used as the sole neutralizing agent, which is preferred; but in certain cases, for economical or other reasons, it may be desirable to employ the silazane in combination with other conventional neutralizing agents such as primary, secondary or tertiary amines, alkali-metal (e.g., sodium, potassium, lithium etc.) hydroxides and carbonates, and others known in the art.

The silazone may be a straight-chain organosilazane as in, for example, hydrocarbyldisilazanes represented by the general formula (VIII) 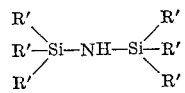

wherein each R' represents a monovalent hydrocarbon radical. Preferably the monovalent hydrocarbon radical represented by R' contains not more than about 7 carbon atoms, e.g., from 1 through 4 carbon atoms.

Illustrative examples of monovalent hydrocarbon radicals represented by R' in Formula VIII are alkyl (including cycloalkyl), e.g., methyl, ethyl and propyl through nonyl (both normal and isomeric forms), cyclopentyl, cyclohexyl and cycloheptyl; alkenyl (including cycloalkenyl), e.g, vinyl, allyl, methallyl, propenyl (beta-allyl), 1-butenyl, 2-butenyl (crotyl), 3-butenyl, pentenyl through nonenyl (both normal and isomeric forms), cyclopentenyl, cyclohexenyl and cycloheptenyl; aralkyl, e.g., benzyl, phenylethyl and phenylpropyl; aralkenyl, e.g., phenylallyl; aryl, e.g., phenyl; alkaryl, e.g., tolyl, xylyl, ethylphenyl and propylphenyl; and alkenylaryl, e.g., phenylallyl.

The silazane also may be an organosilazane as in, for example, hydrocarbylcyclosilazanes represented by the general formula (IX) 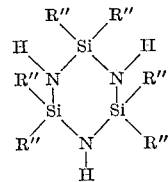

wherein each R" represents a monovalent hydrocarbon radical. As in the case of R' of Formula VIII, R" in the above formula is preferably a monovalent hydrocarbon radical containing not more than about 7 carbon atoms, e.g., from 1 through 4 carbon atoms. Numerous examples of monovalent hydrocarbon radicals represented by R" have been given hereinbefore with particular reference to R' in Formula VIII.

Organocyclosilazanes embraced by Formula IX are members of the larger class of hydrocarbylcyclosilazanes represented by the general formula (X)              (R"$_2$SiNH)$_n$ wherein R" has the same meaning as in Formula IX, and $n$ represents an integer which is at least 3, e.g., 3 through 7. Preferably $n$ is either 3 or 4. Hydrocarbylcyclosilazanes embraced by Formula X that are other than those embraced by Formula IX also may be used in practicing this invention.

The compositions provided by this invention include flowable (more particularly fluid including liquid) compositions containing acidic bodies or species, said bodies having been at least partly neutralized with a neutralizing agent comprising an organosilazane, more particularly a hydrocarbylsilazane and especially those hydrocarbylsilazanes wherein all the substituents attached to Si, other than N, are hydrocarbon radicals as in, for example, a hexa(hydrocarbyl)disilazane such as a hexaalkyldisilazane, specifically hexamethyldisilazane. Preferably the acidic bodies or species (including potentially acidic bodies or species) are substantially completely neutralized with a neutralizing agent comprising essentially or consisting essentially of the silazane. Neutralization is preferably effected under heat, e.g., at temperatures usually within the range of from about 50° C. to about 200° C.; or, in some cases, even as high as about 300° C. at least toward the end of the neutralization period.

The invention is also applicable in the preparation of compositions comprising (1) a substance that normally forms acidic bodies by oxidative deterioration and, to stabilize said substance against such deterioration, an effective amount of (2) a stabilizer comprising at least one hydrocarbylsilazane, e.g., a hexa(hydrocarbyl)disilazane.

The invention has been described more specifically hereinbefore, and for purpose of illustration only, with particular reference to the preparation of organopolysiloxane resins; and especially in improving the precuring characteristics of methylsiloxane and other hydrocarbylsiloxane partial condensation products. Thus, in its more specific aspects, the invention provides a flowable composition, more particularly a liquid composition, comprising a siloxane partial condensation product that normally has appreciable acidity and into which has been incorporated, in an amount sufficient to reduce the said acidity, a silazane of which numerous classes, subclasses and species have been described hereinbefore, and preferably a hexaalkyldisilazane of the kind embraced by Formula II. For instance, the instant invention specifically includes liquid compositions comprising a methylsiloxane partial condensation product together with acidic bodies, said acidic bodies having been substantially completely neutralized under heat with a hexaalkyldisilazane, and specifically with hexamethyldisilazane.

In addition to monomeric precursors of an organopolysiloxane and siloxane partial condensation products, a silazane, which contains the grouping —Si—NH—Si—, may be incorporated into other substances containing acidic bodies in a manner similar or analogous to, and for the same purposes as, that employed in modifying the aforementioned silicon-containing materials; or in any other manner such as after preparation and prior to shipment, or immediately prior to or during use.

Thus, a silazane, alone or with a conventional antioxidant, e.g., beta-naphthol, and/or one or more other conventional modifiers or additives commonly employed, may be incorporated in, for example, mineral oils, e.g., mineral transformer oils; the various fatty oils, e.g., cocoanut, cottonseed, rapeseed, etc., oils; ester-type synthetic lubricating oils; hydraulic fluids; organic heat-transfer fluids; organopolysiloxanes such as those of the cyclic type; latices and various synthetic polymer emulsion systems; and acid-catalyzed resin systems, e.g., thermosetting resin systems such as urea-, melamine- and urea- + melamine-formaldehyde resin systems, and wherein the silazane acts as a control agent. The silazane may be incorporated into any oil, fat, wax, resin or the like, of natural or synthetic origin, which normally forms acidic bodies by oxidative deterioration or otherwise.

As will be apparent to those skilled in the art, modifications of the present invention can be made or followed in the light of the foregoing disclosure without departing from the spirit and scope of the disclosure or from the scope of the claims.

I claim:
1. A process of preparing, without premature gelation, an organopolysiloxane resin, which resin is capable of being further cured, by the steps of
    (1) heating a mixture of
        (A) an organotrialkoxysilane in which the organo radical is a hydrocarbon radical of the group consisting of an alkyl radical having less than 4 carbon atoms and phenyl, and mixtures thereof, and in which the alkoxy radical has less than 4 carbon atoms; and (B) from about 1.5 to 10 moles of water per mole of total silane reactant material, said mixture containing by weight from about 0 to about 650 parts of acid, expressed as HCl, per million parts of total silane reactant material [and water, the maximum of about 650 parts of acid being the approximate upper limit when the silane:water mole ratio is about 1:1.5 and decreasing to a maximum of about zero weight parts of acid, expressed as HCl, per million parts of total silane reactant material and water when the silane:water mole ratio is about 1:10], the heating of said mixture to form a liquid siloxane partial condensation product being continued from about 1 to 10 hours at a temperature from about 50° C. to reflux, while retaining in said mixture at least 1.5 moles of alkanol by-product per mole of silane assuming complete hydrolysis of all alkoxy-silicon linkages in the silane reactant material in the iquid silane mixture;

(2) concentrating the liquid siloxane partial condensation product from step (1) by heating at about 100° to 300° C. to thereby remove volatile material therein including alkanol by-product and water to obtain a liquid residue; and (3) adding to the partial condensation product from step (2) an effective amount of a silazane to control the acidity of the product from step (2) and prevent premature geation thereof, the silazane being of the group consisting of hexaalkyldisilazane in which the alkyl radical has less than 4 carbon atoms and a silazane of the formula (R"₂SiNH)ₙ in which R" is an alkyl group of 1 to 4 carbon atoms and *n* is an integer from 3 to 7; and (4) precuring the partial condensation product from step (3) by heating at a temperature below its gelation point, and within a range of about 100° to 300° C., to remove the remainder of the volatile material and to obtain, without gelation, the more highly condensed organic solvent-soluble, siloxane partial condensation product that is capable of being finally cured to a solid organopolysiloxane resin.

2. A process as defined in claim 1 in which the organotrialkoxysilane is methyltrialkoxysilane.

3. A process as defined in claim 1 in which the organotrialkoxysilane is phenyltrialkoxysilane.

4. A process as defined in claim 1 in which the organotrialkoxysilane is a mixture of methyltrialkoxysilane and phenyltrialkoxysilane.

5. A process as defined in claim 1 in which the organotrialkoxysilane is ethyltrialkoxysilane.

6. A process as defined in claim 1 in which the silazane is hexaalkyldisilazane and it is used in an amount of about 0.0001 to about 1% by weight based on the organopolysiloxane.

7. A process as defined in claim 1 in which the silazane is hexahydrocarbyldisilazane and it is used in an amount of about 0.001 to 1.0% by weight based on the organopolysiloxane.

8. A process as defined in claim 1 in which the organotrialkoxysilane is methyltriethoxysilane and the silazane is hexamethyldisilazane.

9. A process as defined in claim 1 in which the organotrialkoxysilane is phenyltriethoxysilane and the silazane is hexamethyldisilazane.

References Cited

UNITED STATES PATENTS

| | | | |
|---|---|---|---|
| 3,245,918 | 4/1966 | Burzynski | 260—46.5 |
| 3,354,095 | 11/1967 | Burzynski et al. | 260—46.5 |
| 2,579,417 | 12/1951 | Cheronis | 260—28 |
| 3,032,528 | 5/1962 | Nitzsche et al. | 260—46.5 |
| 3,208,972 | 9/1965 | Lyons | 260—46.5 |
| 3,243,404 | 3/1966 | Martellock | 260—46.5 |
| 3,257,330 | 6/1966 | Burzynski et al. | 260—46.5 |
| 3,280,071 | 10/1966 | Beck | 260—46.5 |

DONALD E. CZAJA, *Primary Examiner.*

M. I. MARQUIS, *Assistant Examiner.*

U.S. Cl. X.R.

260—37; 117—124, 135.1, 148; 156—329; 161—193, 213, 270

PO-1050
(5/69)

UNITED STATES PATENT OFFICE
CERTIFICATE OF CORRECTION

Patent No. 3,428,599      Dated February 18, 1969

Inventor(s) Charles W. Newing, Jr.

It is certified that error appears in the above-identified patent and that said Letters Patent are hereby corrected as shown below:

Column 4, line 71, insert -- ( -- between acyloxy and e.g. Column 10, line 33, "porduct" should be --product--. Column 11, line 49, "inhibitators" should be --inhibitors--. Column 14, line 49, "fo" should be --of--. Column 15, line 8, "silazone" should be --silazane--; line 9, "silazones" should be --silazanes--; line 15, insert -- , -- between "ium" and "etc.", line 17, "silazone" should be --silazane--. Column 17, lines 10-17, delete "[and water, the maximum of about 650 parts of acid being the approximate upper limit when the silane:water mole ratio is about 1:1.5 and decreasing to a maximum of about zero weight parts of acid, expressed as HCl, per million parts of total silane reactant material and water when the silane: water mole ratio is about 1:10]"; line 25, "iquid" should be --liquid--; line 34, "geation" should be --gelation--.

SIGNED AND
SEALED

MAR 17 1970

(SEAL)
Attest:

Edward M. Fletcher, Jr.
Attesting Officer

WILLIAM E. SCHUYLER, JR.
Commissioner of Patents